April 18, 1961 J. E. SOLTIS 2,980,192
DUAL BEAM BALANCE SCALE
Filed Jan. 31, 1958
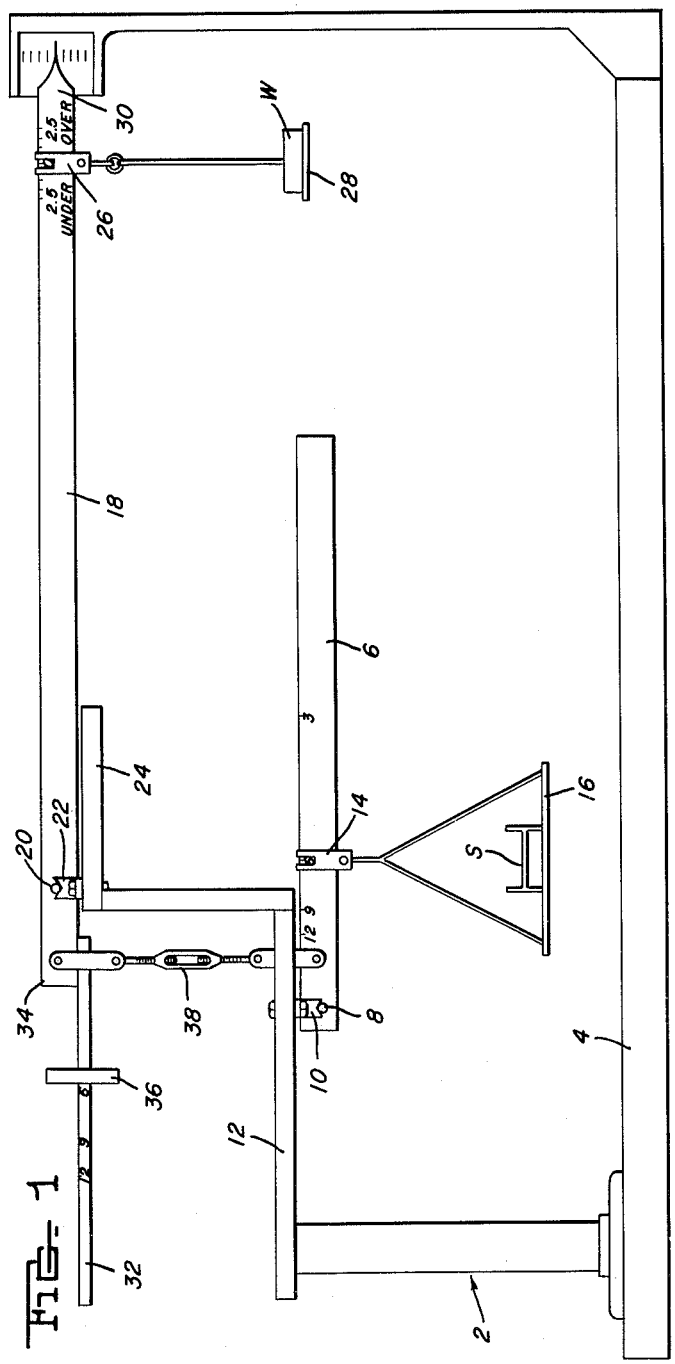
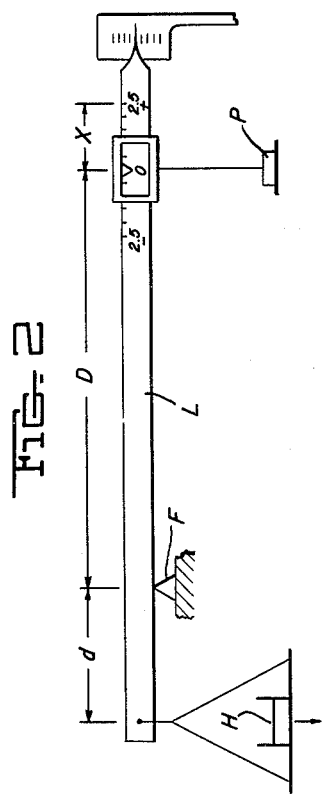
INVENTOR
JOHN E. SOLTIS
By Donald G. Dalton
Attorney United States Patent Office 2,980,192
Patented Apr. 18, 1961

2,980,192

DUAL BEAM BALANCE SCALE

John E. Soltis, Charleroi, Pa., assignor to United States Steel Corporation, a corporation of New Jersey Filed Jan. 31, 1958, Ser. No. 712,486

2 Claims. (Cl. 177—25)

The present invention relates generally to mechanical scales and more particularly to an improved balance apparatus for determining directly whether the weight per foot of length of a rolled product deviates from a given standard weight per foot of length and the percentage of any such deviation.

As is well known, structural steel sections such as H beams, I beams and other structural shapes are rolled and sold on the basis of published standard weights per foot of length, the standard weight in each case depending upon the size and shape of the structural product. Since only slight variation is permitted from such standard weights per foot of length, it is essential for a roller operating a structural rolling mill to be able to determine quickly and accurately whether his mill is producing within-tolerance product.

Prior to the present invention it was necessary to follow a complicated and time-consuming process in order to determine the weight per foot of length of product and any deviation thereof from standard. The process involved obtaining specimens from the first few structural sections produced after the mill had been set up; carefully measuring each specimen using micrometers; and then determining the conformity with or deviation (in percentage) from standard through involved arithmetical calculations. This method of checking was excessively time-consuming, subject to error and, all in all, detrimentally affected production time and costs.

It is, accordingly, an object of the present invention to provide a mechanically operating balance scale for indicating directly, accurately and quickly in percentage any deviation in weight per lineal foot of a rolled structural specimen from a given standard weight.

The nature of the invention and its distinguishing features and advantages will be fully apparent from the following detailed disclosure and the appended claims when read in connection with the accompanying drawings in which:

Figure 1 is a front elevational view of the apparatus of the invention; and

Figure 2 is a diagrammatic illustration of the theoretical principle which is a basis of the invention.

Referring now to the drawings, there is shown in Figure 1 a stationary frame, generally identified by reference numeral 2, mounted on a base 4. The balance apparatus of the invention includes a first beam or arm 6 having a bearing 8 adjacent one end pivoted on a fixed fulcrum 10 rigidly mounted on a member 12 of the frame 2. A slide 14 suitable for supporting a pan 16 is provided on the beam 6. The beam 6 is graduated in inches of length to correspond with the length of a specimen or sample of a rolled product to be suspended from the beam in the pan 16 as will be more fully explained hereinafter.

A second beam or arm 18 having a bearing 20 intermediate its ends is disposed above beam 6 with a bearing 20 pivoted on a fixed fulcrum 22 rigidly mounted on a horizontal member 24 of frame 2. An indicator 26 adapted to support a pan 28 is disposed for adjustable sliding movement along one end portion 30 of beam 18. The end portion 30 of beam 18 is marked with graduations indicating 0 and plus and minus percentages which will be more fully explained hereinafter.

An integral projection 32 is provided extending from the end 34 of beam 18 which slidably supports a balancing weight 36.

An adjustable vertically disposed link 38 connects beams 6 and 18 together. One end of link 38 is pivotally connected with beam 6 at a point intermediate bearing 8 and slide 14 while the other end of the link is pivotally connected with beam 18 at a point adjacent its end 34 on the side of bearing 20 opposite end 30.

A brief explanation of the theory of the operation of the apparatus is interposed at this point to aid in an understanding of the operation of the invention.

Figure 2 illustrates diagrammatically a lever L pivoted on a fulcrum F. A weight H is suspended from the end of the lever nearest the fulcrum at a distance $d$ from the fulcrum. Weight H is the published standard weight of a particular structural section one foot long. For example, this weight may be considered 10 lbs. Weight P, which is less than weight H, is suspended from the lever L adjacent its opposite end. When weight P is D distance from fulcrum F level L will be in balance. This balance point may be considered 0. If weight H is replaced by a weight weighing more than the published standard weight per foot of the particular structural section, the weight P must be moved to a greater distance $(L+X)$ along the lever L away from fulcrum F to balance the lever again.

An algebraic analysis of this principle is as follows:

$$Hd-DP=0$$

or $$Hd=DP$$

(Equation 1)

(This condition prevails when H is the standard weight per foot of the particular structural section.)

When H is greater than the standard weight by some increment then this condition exists:

$$Hd-P(D+X)=0$$

or $$Hd=P(D+X)$$
$$Hd=PD+PX$$

since $$Hd=PD$$

(Equation 1)

then PX is the amount H is overweight, or the error $=PX$.

$$\text{Percent of error}=\frac{(P)X}{(P)D}=\frac{X}{D}$$

(Equation 2)

From this it can be seen that the percent of error in weight depends directly on the constant length D and the variable length X. The weight drops out of the calculation.

Lever L described above, which corresponds to beam 18, would be suitable for checking specimens of structural sections for deviation from a given weight if it were possible to obtain a rolled section which is exactly one foot long at all times. However, in actual practice it is not feasible to obtain specimen sections which are cut to a constant length, therefore, the invention includes beam 6 which compensates for the variation in length of the specimen sections.

In Figure 1 it will be seen that the suspension means for weight H shown in Figure 2 has been replaced by the adjustable link 38 which connects beams 6 and 18 together. By adjusting the position of slide 14 along beam 6 in accordance with the length of the specimen section to be checked variation from the standard length of one foot is compensated for and the percent deviation, if any, from standard can be read directly after the indicator 26 has been adjusted to balance beams 6 and 18.

In operation, before the specimen section S is placed in pan 16, slide 14 is positioned on the graduation of beam 6 which corresponds to the length of the specimen and indicator 26 is positioned at 0 graduation on beam 18. The two beams are then balanced by adjusting the balance weight 36 along the projection 32. Then the specimen S is placed on pan 16 and standard weight W is placed in pan 28. Weight W corresponds to weight P in Figure 2 so that if specimen S is of the required weight per foot the beams will balance with indicator 26 set at 0. However, if specimen S is heavier or lighter than the required standard lbs. per foot indicator 26 will have to be moved to one side or the other of point 0 to balance beams 6 and 18. Then such deviation in percent can be read directly from the position of indicator 26 on beam 18.

For optimum results I have found it preferable to utilize a standard weight W which has a weight ratio approximately 1 to 5 of the standard weight per foot of the section being rolled. For example, if the section being rolled required a standard weight of 10 lbs. per foot I would use a weight W of 2 lbs.

While one embodiment of my invention has been shown and described, it will be apparent that other adaptations and modifications may be made without departing from the scope of the following claims.

I claim:

1. Balance apparatus for determining the deviation of a sample of rolled product from a given standard weight per foot of length which comprises a first beam having a bearing adjacent one end pivoted on a fixed fulcrum, a sample suspending means slidably carried by said first beam; said beam being graduated at the portion thereof which carries said suspending means to correspond with the length of a sample suspended therefrom, a second beam having a bearing intermediate its ends pivoted on a fixed fulcrum, a standard weight adjustably suspended from one end of said second beam, means for varying said standard weight to correspond to a given standard weight per foot of length of a sample of rolled product suspended from said first beam, said one end of said second beam being graduated to show deviation from said given standard weight per foot of said sample suspended from said first beam by the balancing position of the standard weight adjustably suspended from said one end of said second beam, and a link pivotally connecting a point on said first beam between the bearing thereof and the point of suspension of the sample therefrom, with a point on said second beam on the opposite side of the bearing thereof from the point of suspension of said standard weight.

2. Balance apparatus as defined by claim 1 including a balancing weight adjustable along the end of said second beam remote from its said one end.

References Cited in the file of this patent

UNITED STATES PATENTS

| | | |
|---|---|---|
| 346,017 | Austin | July 20, 1886 |
| 852,281 | Milburn | Apr. 30, 1905 |
| 2,172,281 | Higley | Sept. 5, 1939 |
| 2,687,037 | Saxe | Aug. 24, 1954 |

FOREIGN PATENTS

| | | |
|---|---|---|
| 595,419 | Germany | Apr. 12, 1934 |